US006731047B2

(12) United States Patent
Kauf et al.

(10) Patent No.: US 6,731,047 B2
(45) Date of Patent: May 4, 2004

(54) DEVICE WITH ULTRASOUND ADAPTER

(75) Inventors: Adrian Kauf, Wangen (DE); Stefan Tichy, Frastanz (AT); Walter Littmann, Aerzen-Grupenhagen (DE); Jörg Wallaschek, Paderborn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/859,872

(22) Filed: May 17, 2001

(65) Prior Publication Data

US 2003/0001456 A1 Jan. 2, 2003

(30) Foreign Application Priority Data

May 23, 2000 (DE) ........................................ 100 25 352

(51) Int. Cl.[7] .................................................. H02N 2/00
(52) U.S. Cl. ................................... 310/317; 310/323.17
(58) Field of Search ............................ 310/317, 323.17, 310/323.18

(56) References Cited

U.S. PATENT DOCUMENTS

| | | | | | |
|---|---|---|---|---|---|
| 4,271,371 | A | * | 6/1981 | Furuichi et al. | 310/316.01 |
| 4,582,067 | A | * | 4/1986 | Silverstein et al. | 600/455 |
| 4,595,864 | A | * | 6/1986 | Stiefelmeyer et al. | 315/246 |
| 4,652,786 | A | * | 3/1987 | Mishiro | 310/333 |
| 4,705,980 | A | * | 11/1987 | Mishiro | 310/323.19 |
| 4,864,904 | A | * | 9/1989 | Mishiro | 82/137 |
| 4,911,044 | A | * | 3/1990 | Mishiro et al. | 82/158 |
| 5,563,504 | A | * | 10/1996 | Gilbert et al. | 73/660 |

* cited by examiner

*Primary Examiner*—Thomas M. Dougherty
(74) *Attorney, Agent, or Firm*—Sidley Austin Brown & Wood, LLP

(57) ABSTRACT

A device for operating a tool has an ultrasound adapter with an capacitive electro-acoustic transducer (4) connected to an electrical ultrasonic frequency generator (8) for producing ultrasonic wave for a tool (2) driven by the device, wherein the capacitive electro-acoustic transducer (4) is connected with a secondary winding (5) and the ultrasonic frequency generator (8) is connected with a primary winding (7) of a transformer (6).

13 Claims, 2 Drawing Sheets

DEVICE WITH ULTRASOUND ADAPTER

BACKGROUND OF THE INVENTION

The invention relates to a device for operating a tool, such as a core drilling device or a grinding device with an ultrasound adapter, for example, for the abrasive or metal cutting processing of solids, such as building materials, for example, rock, metal or wood.

The abrasive sawing processing of rock by means of a cylindrical cutter or drill bit, edged with hard materials on its leading end, is known, for example, from EPO280835. Such cutters or drill bits usually employ water as a flushing and cooling liquid. The ultrasonic vibrations are formed by capacitive, electro-acoustic transducers in the ultrasonic frequency range. The electrostatic transducer may be constructed, for example, from pre-tensioned piezo disks.

Capacitive electro-acoustic transducers in the ultrasonic frequency range, such as piezo disks, consist of an electrostrictive material as the dielectric of a capacitor, which changes its dimensions under an applied electrical voltage. Because of its mechanical properties, a capacitor of such construction has an intrinsic resonance. To produce sufficient deformations, capacitive electro-acoustic transducers require a high electric voltage.

It is customary to supplement electric (capacitive) behavior of a piezo electric transducer by an inductivity, which is tuned so that the resulting parallel oscillating circuit on the electrical side has the same resonance frequency as the mechanical oscillating circuit, which is determined by the stiffness and mass of the sound converter.

According to the EP0720890B1, a hand device for operating a tool has a rotating, cylindrical, abrasive, material-removing tool, on which a longitudinal ultrasonic field is superimposed axially over a capacitive electro-acoustic transducer consisting of an electrostrictive material. Corresponding to the resonance, the cutter or drill head is designed for the frequency of the ultrasonic field.

According to the U.S. Pat. No. 3,614,484, an ultrasonic adapter for a drill driving a rotating tool, has a capacitive electro-acoustic transducer, which rotates along with the drill, consists of an electrostrictive material and is connected over slip rings with an ac voltage of ultrasonic frequency. The wear, which is caused by mechanical contact and limits the service life, is a disadvantage of such an energy supply. Moreover, due to the use of water and taking into consideration the high voltage required to operate electrostrictive transducers, insulation problems arise, which can affect the safety of the user.

Moreover, according to EP0680060A1, annular, rotatable rotation translators or transformers with, in each case, circular U-shaped parts for stator and rotor are known. Over assigned coils, they transfer electrical energy over an alternating magnetic field from the stator to the rotor.

SUMMARY OF THE INVENTION

It is an object of the invention to avoid the above disadvantages in the realization of a device for operating a tool including an ultrasonic adapter for impressing an ultrasonic oscillation on the tool. A further aspect involves superimposing an ultrasonic oscillation on the rotational movement of the tool.

Essentially, for the contactless transfer of energy, the ultrasonic adapter of a tool device has a capacitive electro-acoustic transducer connected with the secondary winding of a transformer, the primary winding of which is connected with an electrical ultrasonic frequency generator, which produces an ac voltage in the ultrasonic range and accordingly, over the alternating magnetic field, transfers the electrical power contactless to the capacitive electro-acoustic transducer. At the same time, in conjunction with the capacitive electro-acoustic transducer, the secondary winding forms a parallel resonance circuit and, in the resonance case, brings about a voltage overshoot.

The mechanical wear, which is reduced significantly by the contactless transfer of energy, has an advantageous effect on the service life of the device. Moreover, working with water-contaminated materials does not result in any insulation problems during the transfer of energy. By using the secondary winding as parallel inductance, additional inductance is not required for balancing the oscillating electric circuit.

Advantageously, in the case of a possible, yet not necessary movement of the tool, rotating or swinging at least partially about a tool axis, a capacitive electro-acoustic transducer, rotating or swinging along at least partially with the tool, is connected contactlessly over a transformer, which can rotate at least partially, with the ultrasonic frequency generator.

Furthermore, the resonance frequencies of the capacitive electro-acoustic transducer, of the secondary oscillating circuit, of the primary oscillating circuit as well as of the amplitude of the longitudinal oscillations of the tool, especially of a cutter or drill bit, are tuned, to the frequency of the ultrasonic frequency generator.

Preferably, a partial component of the transformer of the contactless energy transfer, for example, the secondary winding, can be used to tune the electrical resonance circuit with the capacitive electro-acoustic transducer.

Moreover, the mass of a partial component of the transformer of the contactless energy transfer, such as the mass of the inner transformer core, can be used for tuning the mechanical resonance circuit of the tool.

Due to the above multiple utilization of partial components of the transformer of the contactless transfer of energy, in conjunction with a radial, nested arrangement of the partial components, such as, from the inside to the outside, of the inner transformer core, the secondary winding, the air gap, the primary winding, the outer transformer core, a largely compact construction can be realized advantageously for the transformer of the contactless transfer of energy.

Advantageously the transformer is formed from two coils within two U-shaped pot cores, the openings of which face one another and which together accordingly form an essentially closed pot core, a coil being assigned nonrotationally to each U-shaped pot core.

Alternatively, the rotatable transformer consists of two U-shaped pot cores, which are nested together, oriented oppositely with respect to the tool axis and contain in each case nonrotationally assigned coils, which are oriented parallel to the tool axis, the primary winding being assigned as the stator, which is connected nonrotationally with the device, and the secondary winding being assigned as the rotor, which is connected nonrotationally with the tool.

Furthermore another advantage, with respect to a diameter, an inner U-shaped pot core and the secondary coil are in the radial interior and an outer U-shaped pot core and the primary coil are in the radial exterior. As a result, there is one degree of freedom of motion parallel to the tool axis, alongside of which a decoupling of the oscillation as well as a dismantling of the transformer, for example, when changing a tool with an integrative capacitive, electro-acoustic transducer and a secondary part of a transformer, becomes possible.

In order to minimize the overall size of she transformer, a winding ratio of 1:1 is advantageous. The small number of windings furthermore results from a supply frequency in the range of 20 to 35 kHz.

The mass of the ferromagnetic, inner transformer core acts as an oscillating mass and can be used to balance the oscillating mechanical system.

Preferably, this internal transformer core is built up from stratified lamellas, which are insulated electrically from one another. In order to avoid eddy current losses, the lamellas follow the magnetic lines of field and are assembled piece-by-piece or shaped by non-cutting procedures.

Furthermore, the capacitive electro-acoustic transducer advantageously is disposed along the tool axis, so that the vibrational amplitude, occurring in the direction of the tool axis, increases the abrasive removal of material by local axial pressure magnification.

Advantageously with respect to the amplitude of the longitudinal oscillations of the tool, the capacitive electro-acoustic transducer is disposed at a vibration node.

BRIEF DESCRIPTION OF THE DRAWING

The invention is explained in greater detail by means of an example and the drawing in which.

DETAILED DESCRIPTION OF THE INVENTION

Figure 1:
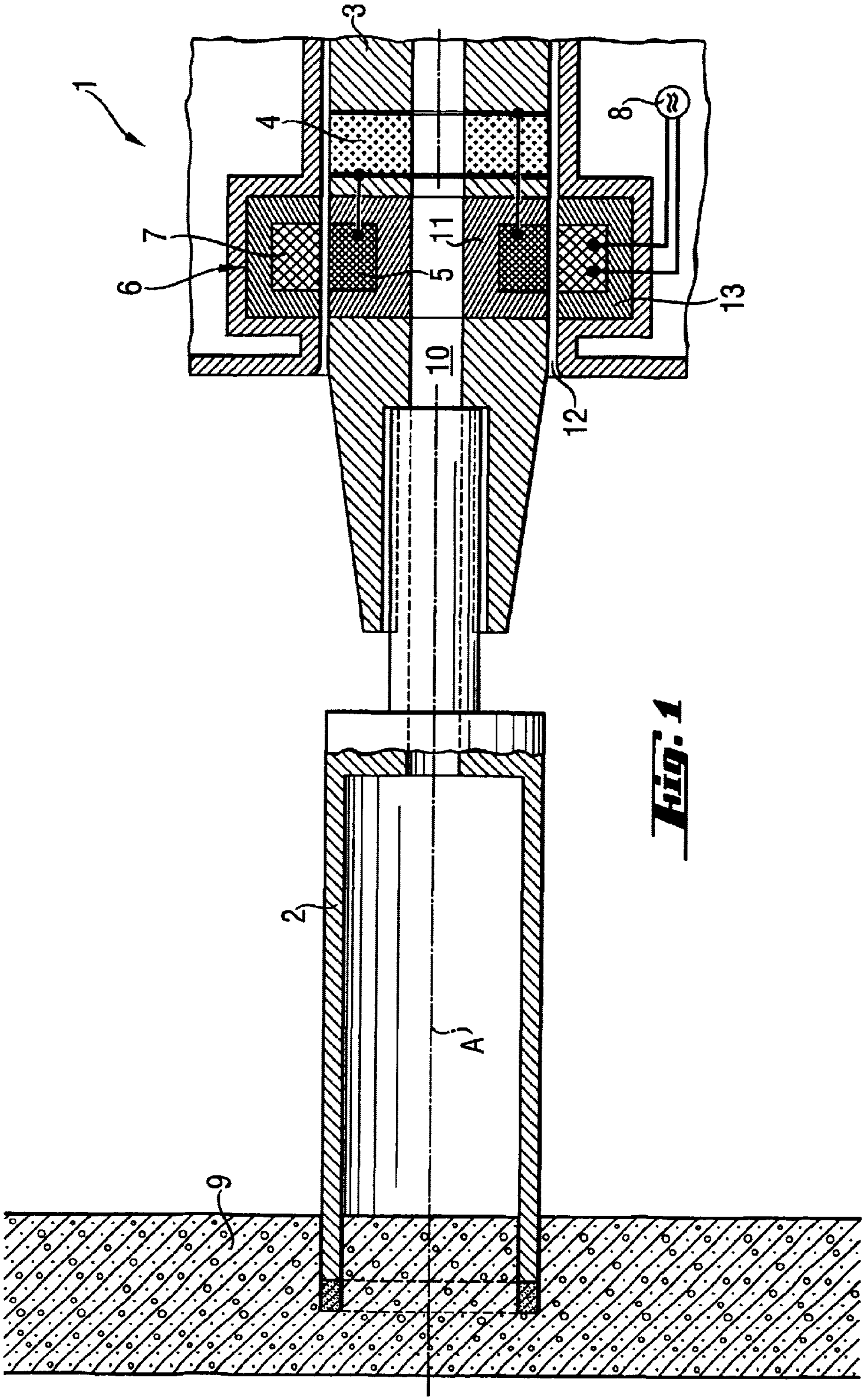
FIG. 1 shows a device in axial section for operating a tool with an ultrasound adapter.

According to FIG. 1, an ultrasound adaptor 1 of a partially illustrated device or part 3, producing a rotational movement of a tool 2 about a tool axis A, has a rotatable, capacitive, electro-acoustic transducer 4 connected with a secondary winding 5 of a rotatable transformer 6, a primary winding 7 is connected in the ultrasonic range with a powerful ultrasonic frequency generator 8, the secondary winding 5 being connected parallel to the capacitive electro-acoustic transducer 4. The tool 2 is in the form of a hollow cutter or drill bit for abrasively cutting cylindrical core boreholes in rock 9 and is connected over a drilling-liquid channel 10 along side the tool axis A with the part 3. The transformer 6 consists of two U-shaped pot cores, the openings of one another, which contain in each case nonrotationally assigned coils, are oriented parallel to the tool axis A. The coil, constructed as a primary winding 7, forms the stator, which is connected nonrotationally with the part 3, and the coil, constructed as the secondary winding 5, forms the rotor, which is connected nontraditionally with the tool 2. Radially, from the inside to the outside, the compactly constructed transformer 6, has a hollow annular U-shaped pot core as internal transformer core 11, the secondary winding 5, an air gap 12, the primary winding 7 and an annular, U-shaped pot core as outer transformer core 13. Axially in the direction of the part 3, the annular, hollow, capacitive electro-acoustic transducer 4 is disposed adjacent to the inner transformer core 11 and the secondary winding 5, as a result of which their mass goes into the mechanical oscillating cycle of the tool 2.

Figure 2:
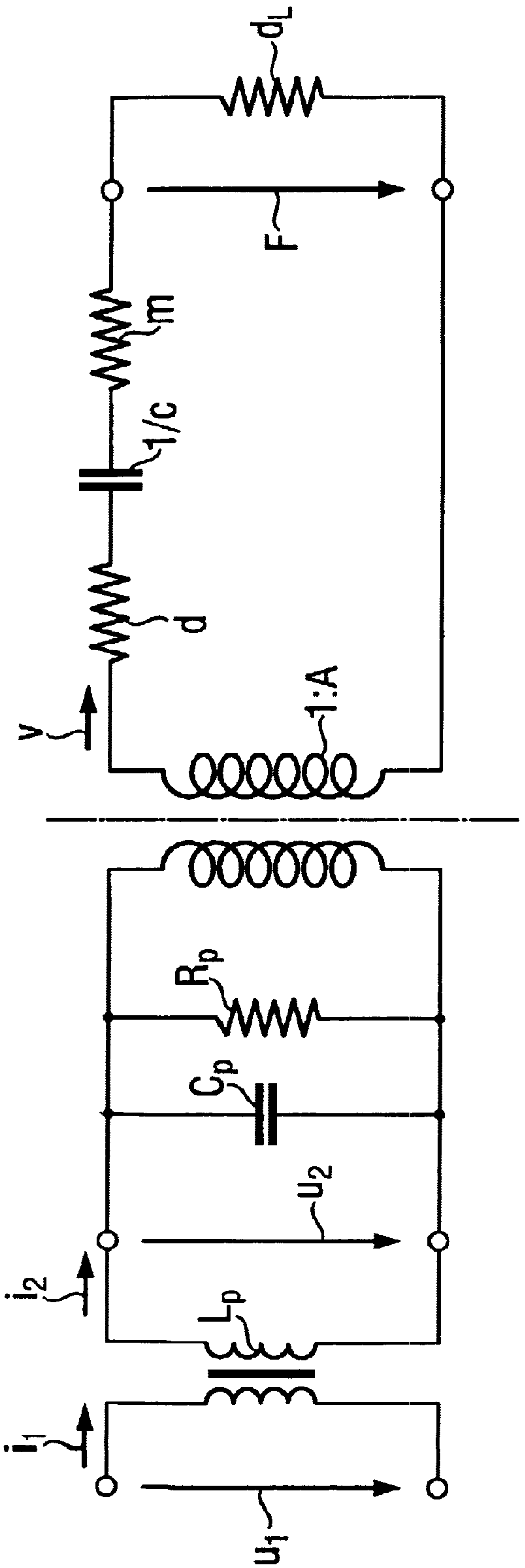
FIG. 2 shows an equivalent circuit of the electrical and mechanical oscillating circuit.

In the parallel circuit off Figure 2 an electrical oscillating circuit, with respect to the ac current $i_2$ and an ac voltage $u_2$, has the inductivity $L_P$ formed by a coil, the capacitance $C_P$, formed by the capacitive, electro-acoustic transducer, and the resistance $R_P$, which is determined by the losses. This electrical oscillating circuit is connected over a jack 1:A with a mechanical oscillating circuit with respect to a displacement velocity v and a displacement force F. The mechanical oscillating circuit is described by the intrinsic attenuation d, the stiffness 1/c and the mass m and the damping load $d_L$. For the inductive transfer of energy, the inductivity $L_P$ is replaced by the secondary side of a transformer, which is supplied with an ac current $i_1$ and an ac voltage $u_1$.

The arrangement was dimensioned by means of an ultrasonic actor requiring 2 kW of power at a frequency of 20 kHz. For a transformer transmitting in the ratio ü=1, a supply voltage of $U_2$=1000 V and $I_2$=2 A results from this. If a material is used, which advantageously conducts the magnetic flux and is not operated at saturation, 120 windings on the primary and secondary sides proves to be advantageous with respected to the area required. This small number off windings is made possible by the use of a supply frequency of 20 kHz.

What is claimed is:

1. A device for driving a tool (2) comprising an ultrasonic adapter (1) including a capacitive electro-acoustic transducer (4), an electrical ultrasonic frequency generator (8) connected via a transformer (6) to said transducer (4) for producing an ultrasonic wave for said tool (2), said transducer (4) is connected to a secondary windup (5) of said transformer (6) and said ultrasonic frequency generator (8) is connected to a primary windup of said transformer (6), whereby said secondary windup (5) is nonrotationally connected with the tool (2) and rotatable with said transformer (6).

2. A device, as set forth in claim 1, wherein said capacitive electro-acoustic transducer (4) has resonant frequencies, said tool (2) has a secondary oscillating circuit and an amplitude of longitudinal oscillations, and the resonant frequencies of said transducer (4) and at least one of the secondary oscillating circuit and the amplitude of the longitudinal oscillations of the tool (2) are dimensioned tuned to one another with the frequency of the ultrasonic frequency generator (8).

3. A device, as set forth in claim 1, wherein at least one of the ultrasound adapters (1) and the tool (2) in dimensioned for a resonance frequency in the range front 20 to 35 KHz.

4. A device, as set forth in claim 1, having a part (3) for driving said tool (2), said part (3) and said tool having an axis (A), and said capacitive electro-acoustic transducer (4) in the direction of the axis (A) is disposed axially adjacent to said secondary winding (5).

5. A device, as set forth in claim 4, wherein relative to said axis (A) and radially outwardly therefrom said transformer (6) comprises an inner transformer core (11), the secondary winding (5), an annular air gap 12 said primary windings (7) and an outer transformer core (13).

6. A device, as set forth in claim 5, wherein said transformer (6) comprises two coils each within a pot core one forming said inner transformer core (11) and the other forming said outer transformer core (13), said pot cores each having an opening facing one another, each said pot core having a coil therein arranged non-rotational thereto, said primary winding (7) forming a stator of said transformer (6) and arranged non-rotational relation to said part (3), and said secondary windings (5) arranged as a rotor of said transformed (6) and being non-notational relative to said tool (2).

7. A device, as set forth in claim 4, wherein said transformer (6) comprises two pot cores each forming a separate transformer core nested one within the other and encircling said axis (A), one of said transformer cores arranged non-rotational relative to said part (3) and forming said primary coil (7) comprising a stator of said transformer (6) and the other one of transformer cores arranged non-rotational relative to said tool (2) and forming said secondary coil (5) comprising a rotor of said transformer (6).

8. A device, as set forth in claim 1, wherein said tool is arranged interchangeably with said integration capacitive electro-acoustic transducer (4) and said secondary winding (5) of said transformer (6).

9. A device, as set forth in claim 1, wherein said transformer (6) is arranged so that it can at least one of rotate and sway partially about said tool axis (A).

10. A device, as set forth in claim 9, wherein said transformer has an inner transformer core (11) and an outer transformer core (13), and the mass of the inner transformer can be used for balancing a swinging mechanical system of said device.

11. A device, as set forth in claim 5, wherein said inner transformer core (11) is formed of stratified lamellas electrically insulated from one another.

12. A device, as set forth in claim 2, wherein said capacitive electro-acoustic transducer (4) is disposed at a vibration node with respect to the amplitude of longitudinal oscillation of said tool (2).

13. A device, as set forth in claim 4, wherein at least one of said tool (2), said transformer (6) and said capacitive electro-acoustic transducer (4) is arranged as a hollow member encircling said axis (A).

* * * * *